(12) United States Patent
Zaglio et al.

(10) Patent No.: US 11,391,519 B2
(45) Date of Patent: Jul. 19, 2022

(54) HEAT BATTERY

(71) Applicant: Sunamp Limited, Edinburgh (GB)

(72) Inventors: Maurizio Zaglio, Edinburgh (GB); Santokh Singh Gataora, Edinburgh (GB); Andrew Bissell, Edinburgh (GB)

(73) Assignee: Sunamp Limited, Edinburgh (GB)

( * ) Notice: Subject to any disclaimer, the term of this patent is extended or adjusted under 35 U.S.C. 154(b) by 0 days.

(21) Appl. No.: 17/278,774

(22) PCT Filed: Sep. 30, 2019

(86) PCT No.: PCT/GB2019/052756
§ 371 (c)(1),
(2) Date: Mar. 23, 2021

(87) PCT Pub. No.: WO2020/065353
PCT Pub. Date: Apr. 2, 2020

(65) Prior Publication Data
US 2021/0310750 A1 Oct. 7, 2021

(30) Foreign Application Priority Data

Sep. 28, 2018 (GB) ..................................... 1815821

(51) Int. Cl.
*F28D 20/02* (2006.01)
*F28D 20/00* (2006.01)
(52) U.S. Cl.
CPC ......... *F28D 20/021* (2013.01); *F28D 20/028* (2013.01); *F28D 2020/0078* (2013.01)
(58) Field of Classification Search
CPC ....... F28D 20/021; F28D 20/028; Y02E 60/14
See application file for complete search history.

(56) References Cited

U.S. PATENT DOCUMENTS

| | | | | |
|---|---|---|---|---|
| 4,609,036 A | * | 9/1986 | Schrader | ............... F28D 20/021 165/10 |
| 2006/0060326 A1 | * | 3/2006 | Halfmann | ............... F24F 1/022 165/11.1 |
| 2016/0195340 A1 | | 7/2016 | Bissell et al. | |
| 2017/0241649 A1 | * | 8/2017 | Cave | ................... F28D 20/0056 |
| 2019/0145631 A1 | * | 5/2019 | Wideman | ............ F28D 20/0034 122/13.01 |

FOREIGN PATENT DOCUMENTS

| | | | | | |
|---|---|---|---|---|---|
| JP | | 59095322 A | * | 6/1984 | .............. F24D 11/00 |
| JP | | S6078293 A | | 5/1985 | |
| KR | | 20120069926 A | | 6/2012 | |
| KR | | 20160015290 A | | 2/2016 | |
| WO | | 2014191778 A1 | | 12/2014 | |

OTHER PUBLICATIONS

International Preliminary Report on Patentability corresponding to International Patent Application No. PCT/GB2019/052756 (17 pages) (dated Aug. 11, 2020).
International Search Report and the Written Opinion of the International Searching Authority corresponding to International Patent Application No. PCT/GB2019/052756 (9 pages) (dated Feb. 5, 2020).

* cited by examiner

*Primary Examiner* — Eric S Ruppert
(74) *Attorney, Agent, or Firm* — Myers Bigel, P.A.

(57) ABSTRACT

There is herein described a heat battery design for horizontal and vertical planes and a heat battery using a separate volume compensator. In particular, there is described an improved heat battery design which overcomes the problem of over-pressurisation within a battery cell during use.

15 Claims, 10 Drawing Sheets

HEAT BATTERY

FIELD OF THE INVENTION

The present invention relates to a heat battery design capable of overcoming over-pressurisation problems for both horizontally and vertically oriented heat batteries. The heat battery may comprise an expandable device or alternatively a separate volume compensator which is capable of controlling the pressure inside the heat battery.

BACKGROUND OF THE INVENTION

There is a need in the field to provide an improved heat battery arrangement which is capable of controlling the pressure inside a heat battery and, in particular, a phase change material (PCM) heat battery.

In the prior art and when a heat battery is depleted, the transfer of heat within the battery can lead to changes in the level of the phase change material (i.e. PCM). The PCM level may be found to rise and compress air reservoirs within the battery cell. This may lead to over-pressurisation and damage occurring to the battery cell. This can have a detrimental effect on both the efficiency and lifetime of the battery. The over-pressurisation also provides safety problems and hazards with high pressures being exerted on battery casings which can sometimes rupture leading to toxic material leaking from the batteries. There is therefore a safety concern with over-pressurised batteries which the present invention addresses.

In the event that the heat battery is installed in horizontal planes, it has been found that such arrangements are very inefficient and significant performance drops are encountered.

It is an object of at least one aspect of the present invention to obviate or mitigate at least one or more of the aforementioned problems.

It is a therefore object of at least one aspect of the present invention to provide improved heat batteries which can operate in both horizontal and vertical planes with increased performance levels and overcome over-pressurisation effects.

The present invention therefore addresses problems in heat batteries containing PCM material such as over-pressurisation, reduction in performance of the heat battery and components of the heat battery such as control sensors and heating elements being outside the active part of the cell and therefore impairing functionality of the heat battery.

SUMMARY OF THE INVENTION

According to a first aspect of the present invention there is provided a heat battery comprising:
a battery cell case;
phase change material (i.e. PCM) located within the battery cell case;
an expandable device located within the battery cell case which is capable of expanding and contracting to manage expansion and/or volumetric changes within the battery cell case.

The present invention therefore relates to the use of an expandable device which is used to manage expansion and/or volumetric changes inside the battery cell case.

The expandable device may be an inflatable member which may be inflated and/or deflated.

The present invention addresses a range of problems such as over-pressurisation, reduction in performance of the heat battery and components of the heat battery such as control sensors and heating elements being outside the active part of the cell and therefore impairing functionality of the heat battery.

The expandable device (e.g. a pressurised gas balloon or air balloon) may be used to manage the expansion changes in volume of the PCM and the pressure in the heat battery cell during the thermal cycling of the heat battery.

In particular embodiments, the heat battery may be located in a vertical orientation or a substantially vertical orientation (i.e. plane).

The expansion and/or volumetric changes may be caused due to a range of parameters such as expansion and/or contraction of the volume of the PCM. There may also be gas (e.g. air) trapped within the battery cell case which expands and/or contracts depending on temperature and/or the pressure being exerted on it from other components within the battery cell case such as the PCM. These expansion and/or volumetric changes lead to prior art batteries becoming over-pressurised.

During operation of the heat battery of the present invention there will be thermal cycling and the expandable device may be used to control the pressure inside the battery cell case and keep the pressure at, for example, a pre-determined optimal pressure. By controlling the pressure avoids any form of hazards and dangers associated with over-pressurisation. By having such control may also extend the lifetime of the heat battery by preventing excessive pressures and/or temperatures being exerted on components of the heat battery such as the PCM, heat exchangers and control sensors.

In particular embodiments, the expansion device may be a gas balloon (e.g. an air balloon) which may be over-pressurised or under-pressurised to thereby control the pressure inside the battery cell case. The pressurisation of the balloon may be controlled.

It has been found that such an arrangement of using an expandable device (e.g. a pressurised air balloon) is suitable not only for heat batteries positioned in a vertical or substantially vertical position but also in a horizontal or substantially horizontal position.

The heat battery comprises a battery cell case. The cell case may be any form of container capable of holding the PCM and forming typically a sealed enclosure e.g. an air tight closure.

The PCM may be any suitable PCM which makes the present invention highly adaptable for a range of applications and heat storage requirements.

The battery cell case may comprise an opening in the form of a filling port which may typically be located on a side of the battery cell case.

The opening (e.g. filling port) may be used to, for example, pour PCM into the battery cell case.

The battery cell case may also comprise battery flow and return pipes which may optionally be located on a side of the battery cell case, such as for example, above the filling port.

The battery flow and return pipes may optionally be located at, substantially at, or towards the upper surface of the PCM.

The battery cell case may also optionally comprise a cover plate located in, for example, the upper front of the heat battery cell which allows the expandable device (i.e. balloon) to be removed for servicing.

It should be noted that typically there may be one expandable device, two expandable devices or a plurality of expandable devices located in the upper area of the battery cell case above the PCM. Preferably, there may only be one expandable device.

A heat exchanger may also the immersed in the PCM. Typically, the heat exchanger is fully immersed in the PCM. Any suitable form of heat exchanger may be used in the present invention. There may be one or a plurality of heat exchangers immersed in the PCM.

The expandable device may be in any suitable form which may be inflated and/or deflated and may, for example, in particular embodiments be an inflatable balloon.

The expandable device may be any suitable shape and form and may, for example, be manufactured from any suitable plastics material which has a degree of expansion and/or elasticity. The material of the balloon should also be resistant to the material forming the PCM.

The expandable device (e.g. balloon) they also comprise a gas filling valve (e.g. an air filling valve).

The gas filling valve may extend out of the battery cell case allowing air to enter and/or exit the expandable device.

The gas filling valve may be used to increase and decrease the pressure and amount of gas (e.g. air) held within the expandable device (e.g. balloon). In particular embodiments, the expandable device may be preferred to be an inflatable balloon which may, optionally, be tubular in shape. However, any suitable shape may be used.

The pressures within the expandable device may range from about 0.1 bar gauge to about 6 bar gauge (i.e. about 1.1 bar absolute to about 7 bar absolute).

The cross-sectional diameter of expandable device may be expanded and/or contracted to adapt for the expansion and contraction of material held within the battery cell case such as the PCM and any form of gas (i.e. air) trapped/sealed within the battery cell case.

For example, the cross-section diameter of the expandable device may be expanded and/or contracted to cover at least about 50%, about 40%, about 30%, about 20%, about 10% or about 5% of the vertical height of the battery cell case.

A specific advantage of the expandable device (e.g. balloon) is that very minor changes such as less than about 5%, less than about 1% or less than about 0.5% may be made to the cross-section diameter of the expandable device by very slightly altering the pressure of the gas within the expandable device.

The expandable device of the present invention may therefore be used to finely tune the operation of the heat battery allowing the heat battery to operate at its optimal performance levels and to also avoid any form of degradation of the PCM and dangers associated with over-pressurisation.

During the charging and discharging of the PCM this will result in expansion and/or contraction of materials held within the battery cell case such as the PCM and any trapped/sealed gas. The expandable device is able to counteract any of these expansions and/or contractions.

In particular embodiments, the PCM may expand and/or contract within the boundary limits in a vertical plane between levels represented by reference numerals 'A' and 'B'.

The expandable device (e.g. balloon) of the present invention may therefore be expanded and/or contracted depending on the expansion or contraction of the materials (e.g. PCM) and/or gas (e.g. air) held within the battery cell case.

The battery cell case may comprise control sensors which may be used to monitor the expansion and/or contraction of the PCM by monitoring the level of the PCM. The control sensors may also monitor the temperature and/or pressure of any air trapped within the battery cell case.

Any suitable form of sensors may be used for this monitoring.

The control sensors may transmit their measurements to a control system which may then activate a pressurisation and/or depressurisation of the expandable device (e.g. balloon). Such a control system allows the expandable device (e.g. balloon) to constantly keep the heat battery operating at its optimal and maximum efficiency. Gas (e.g. air) may therefore be fed into and/or allowed out of the gas filling valve depending on the monitored height level of the PCM and any other measurements of, for example, the temperature and/or pressure of any gas (e.g. air) trapped within the battery cell case.

To ensure that the integrity and functionality of the expandable device (e.g. balloon) is maintained it is optionally preferred that:
  a) the material of the balloon will be compatible with the PCM e.g. metallised plastics
  b) a battery charging pipe arrangement inside the battery will be arranged such that there is no permanent presence of PCM surrounding the balloon when the PCM is in solid state.

The heat battery of the present invention may also in alternative embodiments be located in a horizontal or substantially horizontal plane. The components are the same as set out above but the heat battery is now, in effect, on its side. In this embodiment, the PCM may expand and/or contract between two horizontal levels i.e. level 'A' and level 'B'.

The PCM may therefore expand and/or contract between horizontal levels 'A' and 'B'. Similar to above, to avoid any form of over-pressurisation the expandable device (e.g. balloon) may be expanded and/or contracted. Once again, this allows the heat battery to operate at its optimal and maximum efficiency. Additionally, any form of hazards associated with over-pressurisation are avoided.

The pressures within the expandable device (e.g. balloon) may range from about 0.1 bar gauge to about 6 bar gauge (i.e. about 1.1 bar absolute to about 7 bar absolute).

The cross-sectional diameter of the expandable device (e.g. balloon) may be expanded and contracted to adapt for the expansion and contraction of material held within the battery cell case such as the PCM. The expandable device may also compensate for the expansion and/or contraction of any gas (e.g. air) trapped within the battery cell case. For example, the cross-section diameter of the balloon may be expanded and contracted to cover at least about 50%, about 40%, about 30%, about 20%, about 10% or about 5% of the vertical height of the battery cell case.

A specific advantage of the expandable device (e.g. balloon) is that also very minor changes such as less than about 5%, less than about 1% or less than about 0.5% may be made to the cross-sectional diameter of the expandable device by very slightly altering the pressure of the gas within the expandable device (e.g. balloon). The expandable device (e.g. balloon) of the present invention may therefore be used to finely tune the operation of the heat battery allowing the heat battery to operate at its optimal performance levels and to also avoid any form of degradation and dangers associated with over-pressurisation.

Typically, the pressurised air balloon may be made from material which is compatible with the PCM. For example, the pressurised air balloon may be made from plastics material such as metallised plastics.

In addition, the heat battery may comprise at least one or a plurality of battery charging pipes located inside the battery which may be used to prevent any permanent presence of PCM surrounding the balloon in the solid state.

During use, the PCM may expand and/or contract and the pressurised air balloon may be used to compensate for this expansion and/or contraction.

According to a second aspect of the present invention there is provided a method of managing expansion and/or volumetric changes within the battery cell case comprising:
providing a battery cell case;
providing a phase change material (i.e. PCM) located within the battery cell case;
providing an expandable device located within the battery cell case which is capable of expanding and contracting to manage expansion and/or volumetric changes within the battery cell case.

The battery cell case and components may be as defined in the first aspect and may be used in any combination with the method of managing the expansion and/or volumetric changes within the battery cell case.

According to a third aspect of the present invention there is provided a heat battery system comprising a heat battery and a volume compensating chamber, the heat battery comprising:
a battery cell case; and
phase change material (i.e. PCM) located within the battery cell case; and
wherein the volume compensating chamber is connected to the heat battery and the volume compensating chamber is capable of managing any expansion and/or contraction changes in the volume of the PCM located within the battery cell case of the heat battery.

The volume compensating chamber may be a gas chamber (e.g. an air chamber) which functions as a volume compensator. The volume compensating chamber may be able to contain/control gas inside the battery cell case which is under-pressure and/or over-pressure i.e. atmospheric pressure.

The volume compensating chamber is preferably a separate unit from the heat battery.

The volume compensator functions to manage any expansion and/or contraction changes in the volume of the PCM. The volume compensator may also function to manage any expansion and/or contraction changes in any gas (e.g. air) trapped/sealed within the battery cell case.

The heat battery may in particular embodiments be in a vertical or a substantially vertical orientation.

Located inside the battery cell case there may also be a heat exchanger or a plurality of heat exchangers. The heat exchangers may typically be immersed in the PCM.

On a side of the battery cell case there may be at least one or a plurality of battery flow and return pipes. The battery flow and return pipes may be located at or just below the upper surface of the PCM.

On a side of the battery cell case there may also be an access cover which allows access to the inside of the battery cell case and the PCM.

The access cover may also provide access to a sealed receptacle located within the battery cell case allowing this to be removed and/or repositioned as required.

Located above the PCM there may optionally be the sealed receptacle which may be in the form of a sealed tube. The sealed receptacle may be in any suitable shape and size. The sealed receptacle may extend along and across all or substantially all of the upper surface of the PCM. The sealed receptacle may therefore form a covering across all or substantially all of the upper surface of the PCM.

On the upper surface of the battery cell case there may also be a port such as a self-sealing expansion port. The port may be connected to the gas chamber forming the volume compensating chamber.

The volume compensating chamber may be a separate gas chamber (e.g. air chamber) which allows air to be fed into and/or out of the expansion port and into the battery cell case.

The volume compensating chamber may therefore function as a volume compensator. The volume compensator chamber is optionally separate from the heat battery. This allows the volume compensator chamber to be positioned remotely from the heat battery. This provides a number of advantages such as allowing the volume compensator chamber to control the pressure inside the heat battery thereby overcoming over-pressurisation problems and the associated hazards.

In particular embodiments, the operating height of the heat battery can be increased and decreased depending on the heat and/or discharge level of the PCM. For example, the operating height of the heat battery can be increased to accommodate an expansion of the PCM so that the operating height of the heat battery is sufficient for the expanded volume of the PCM. In the event that the PCM contracts and the upper level of the PCM drops down, then the operating height of the heat battery can be decreased to accommodate the contraction of the PCM. This allows the pressure inside the battery cell case to be constantly controlled and kept constant at a pre-determined optimal pressure. This may, for example, be atmospheric pressure. This enhanced control of the heat battery avoids any form of hazards and dangers associated with over-pressurisation.

The battery cell case may be filled by removing an access cover and the volume compensating chamber may be connected to the heat battery via an expansion port. The expansion port may preferably be self-sealing and gas-tight i.e. air-tight.

In use, and when the heat battery is in the vertical or substantially vertical orientation, the sealed receptacle is typically removed. There may therefore be an air gap above the PCM.

During use of the heat battery in the vertical or substantially vertical orientation the PCM can expand from, for example, a level 'A' up to level 'B'. During such an expansion, the gas (e.g. air in the air gap) above the PCM will become compressed. The compressed gas may exit via the expansion port (e.g. self-sealing expansion port) into the volume compensator chamber. The pressure of the gas above the PCM may therefore be kept constant and/or at a pre-determined optimal pressure. This may, for example, be atmospheric pressure. Therefore, the PCM may expand up to level 'B' and the gas (i.e. air in the air gap) in the heat battery may be compressed into the volume compensator chamber.

In the event that the pressure drops in the gas (e.g. air) above the PCM, then gas may exit from the volume compensator chamber back into the heat battery via the expansion port (e.g. self-sealing expansion port). It should be noted that the self-sealing expansion port is only one option of achieving the required balance of pressure and any other form of port or device to control the pressures may be used.

Any suitable mechanism and/or device which allows the gas to transfer between the volume compensating chamber the gap may be used.

Using such a battery system with a volume compensating chamber also allows the battery system to be used in a horizontal or substantially horizontal position. In the event that the heat battery is to be used in the horizontal or substantially horizontal position, then the access cover may be removed and the volume compensator also removed and repositioned. The sealed receptacle may then be inserted into the battery cell case. The volume compensator chamber may then be fitted onto a surface (e.g. an upper surface or side) of the heat battery when it is positioned in the horizontal or substantially horizontal position. The volume compensator chamber is therefore in a different position to that when it is used in the vertical or substantially vertical position.

In the horizontal or substantially horizontal position the battery cell case may be filled with PCM until there is a small gap between the upper surface of the PCM and the upper located surface of the battery cell case. The gap may be less than about 10 cm, less than about 5 cm, less than about 1 cm or less than about 0.5 cm.

The inner face of the upper surface of the battery cell case may optionally be contoured with, for example, grooves and/or channels which help to direct the expansion volume of the PCM.

During use and on expansion of the PCM, air may evacuate from the gap into the volume compensating chamber. In the event that the PCM contracts then air is released from the volume compensating chamber back into the gap. The pressure in the gap may therefore be constantly controlled and kept constant at a pre-determined optimal pressure. This may, for example, be atmospheric pressure. This enhanced control of the heat battery avoids any form of hazards and dangers associated with over-pressurisation.

According to a fourth aspect of the present invention there is provided a method of managing any expansion and/or contraction changes in the volume of a PCM located within a battery cell casing comprising:
providing a battery cell case;
providing phase change material (i.e. PCM) located within the battery cell case; and
wherein the volume compensating chamber is connected to the heat battery and the volume compensating chamber is capable of managing any expansion and/or contraction changes in the volume of the PCM located within the battery cell case of the heat battery.

The battery cell casing may form part of a battery system as set out in the third aspect. Any combination of the features of the battery system of the third aspect may be used in the method of managing any expansion and/or contraction changes in the volume of the PCM located within the battery cell casing.

DESCRIPTION OF THE FIGURES

Embodiments of the present invention will now be described, by way of example only, with reference to the following Figures.

DETAILED DESCRIPTION

Figure 1A:
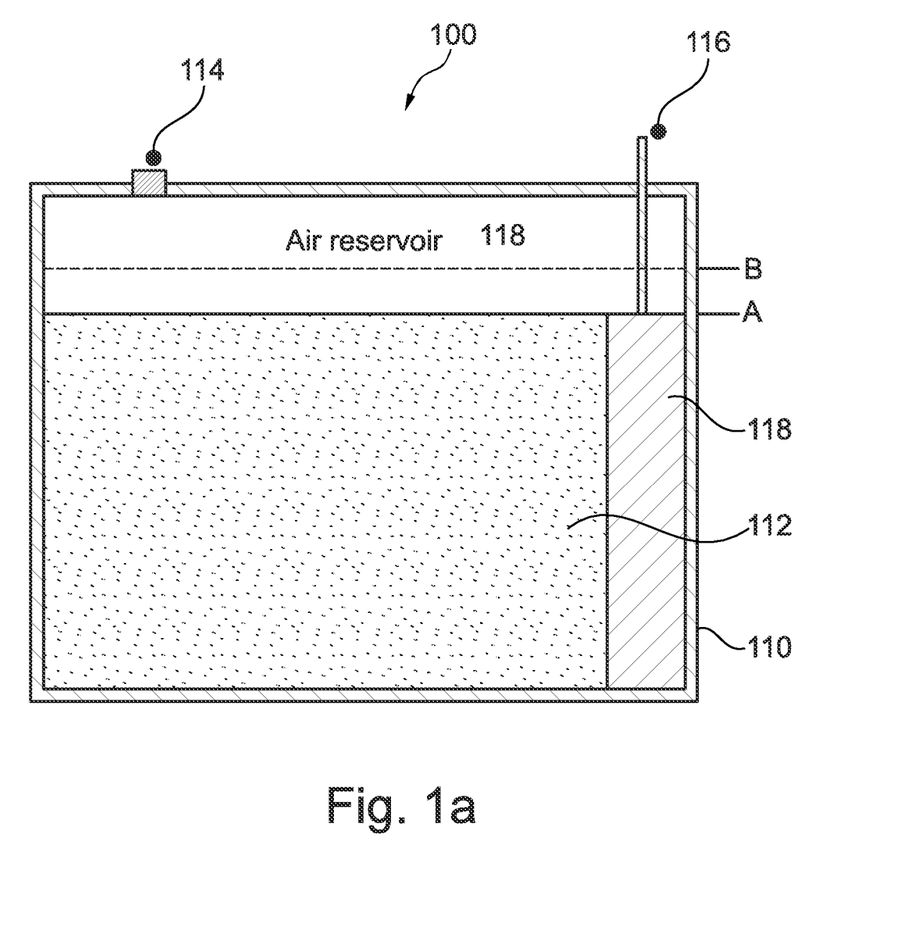
FIGS. 1a and 1b represent a heat battery according to the prior art positioned in a vertical or substantially vertical orientation.
Figure 1B:
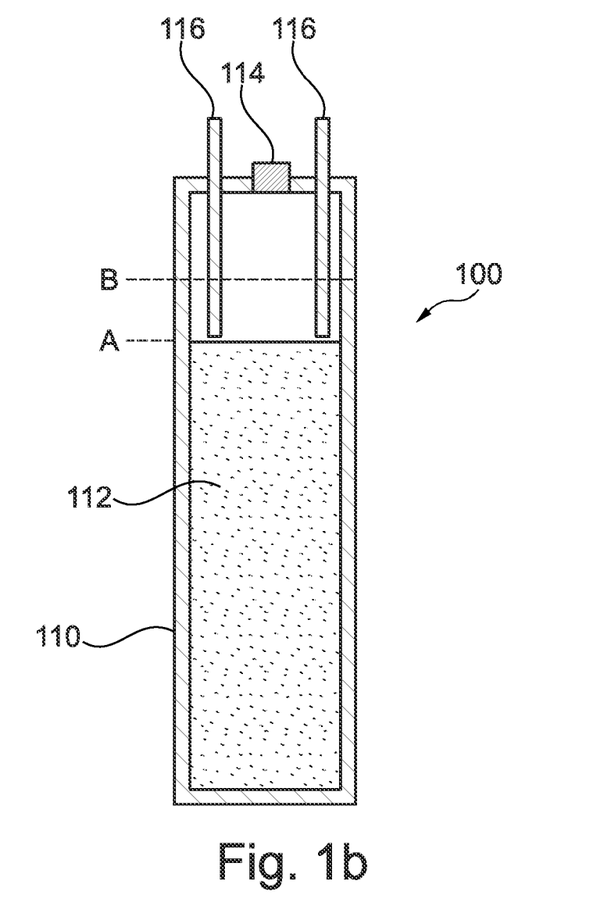

A representation of a prior art heat battery design generally designated 100 is shown in FIGS. 1a and 1b. The heat battery 100 in both FIGS. 1a and 1b is positioned in a vertical or a substantially vertical orientation.

FIG. 1a is a sectional side view of the heat battery 100 and FIG. 1b is a sectional end view of the heat battery 100.

As shown in FIGS. 1a and 1b, the heat battery 100 comprises a battery cell case 110. Contained within the battery cell case 110 there is PCM 112 and a heat exchanger 118. The PCM 112 fills about three quarters of the battery cell case 110.

FIGS. 1a and 1b also show that there is a filling port 114 located on an upper side of the battery cell case 110. The filling port 114 may be used as an inlet to pour material such as PCM into the battery cell case 110. The filling port 114 may be closed using any form of closure device such as a stopper.

There is also shown a series of battery flow and return pipes 116 which may be used in the operation of the heat battery 100. Any suitable number of battery flow and return pipes 116 may be used. The battery flow and return pipes 116 extend into the battery cell case 110 towards the upper region of the PCM 112.

As shown in FIGS. 1a and 1b there is an air reservoir located above the PCM 112 within the battery cell case 110.

When the heat battery 100 is depleted, and expended most of its energy, the height of the phase change material (i.e. PCM) identified by reference numeral 'A' just covers the upper surface of the heat exchanger in the battery cell 110.

When heat is transferred to the heat battery 100 for storage, the level of PCM level in the heat battery 100 rises to level 'B' and compresses an air reservoir 118 in the battery cell case 110. The air reservoir 118 has been found to become over-pressurised in prior art devices.

In particular examples, the vertical or substantially vertical rise and fall of the PCM may range from about 0.5-30%, about 1-20% and about 1-10% of the height of the battery cell case 110.

Figure 2:
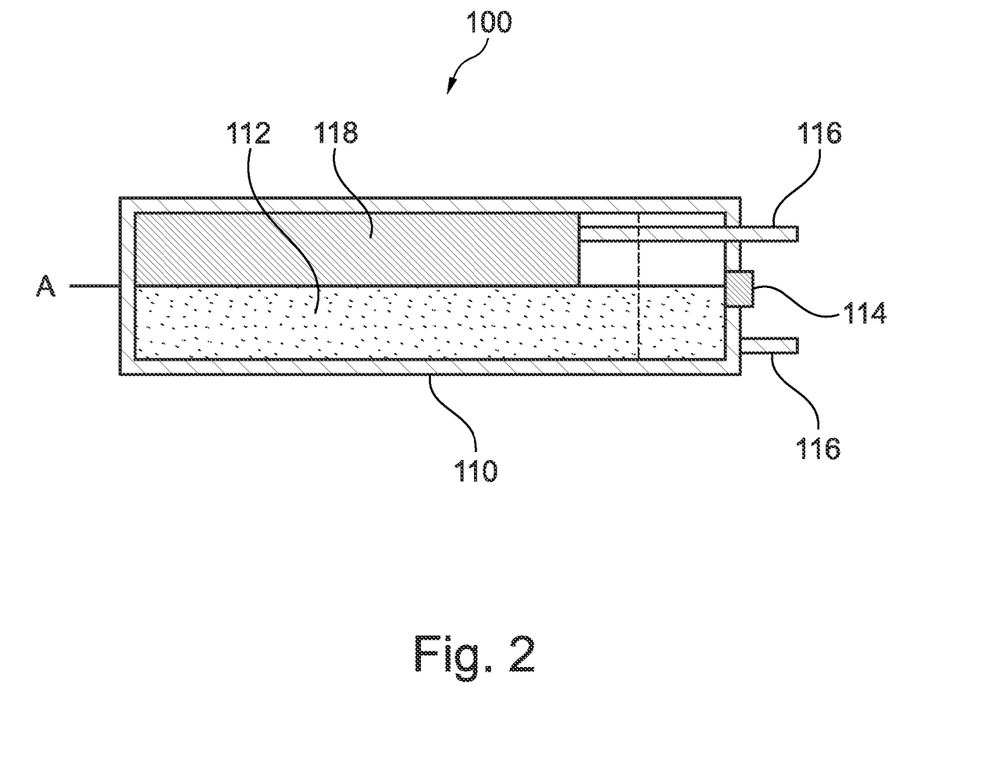
FIG. 2 represents the heat battery shown in FIGS. 1a and 1b positioned in a horizontal or substantially horizontal orientation according to the prior art.

If the heat battery 100 is now installed in the horizontal orientation or a substantially horizontal orientation as shown in FIG. 2, the level of PCM 112 will drop to height, 'A', and a significant proportion of the heat exchanger 118 will be above height of PCM 112 in the battery cell case 110. Therefore:
a) the performance of the heat battery 100 will be significantly reduced (up to about 40%).
b) Control sensors and heating elements (if fitted) could be outside the active part of the cell and thus functionality would be impaired.

The present invention addresses the problems set out above such as over-pressurisation, reduction in performance of the heat battery and components of the heat battery such as the control sensors and heating elements being outside the active part of the cell due to contraction and/or expansion of the PCM and therefore impairing functionality of the heat battery.

Figure 3A:
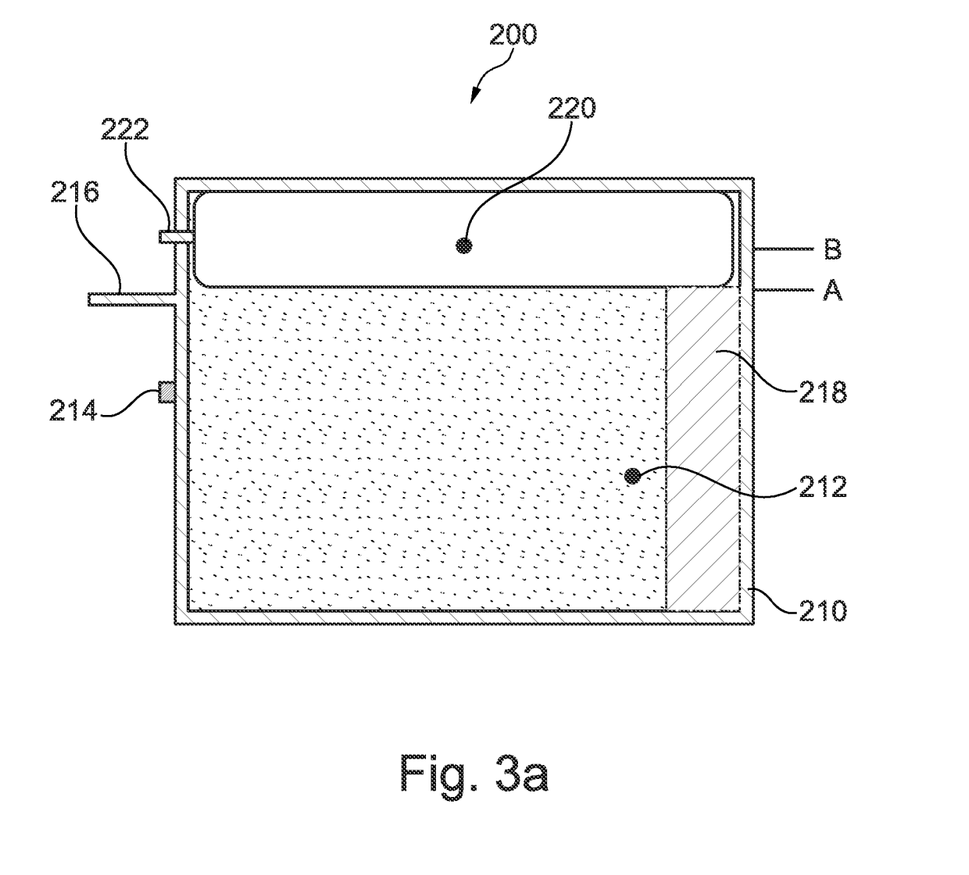
FIGS. 3a and 3b represent a heat battery according to an embodiment of the present invention in a vertical or substantially vertical orientation.
Figure 3B:
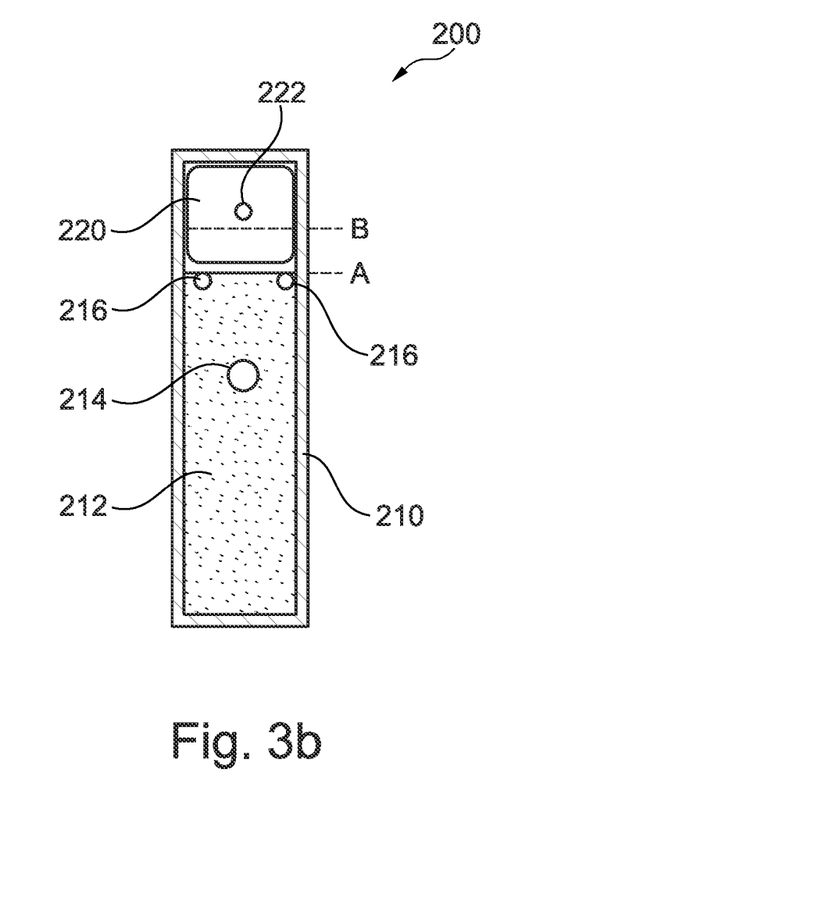
Figure 3C:
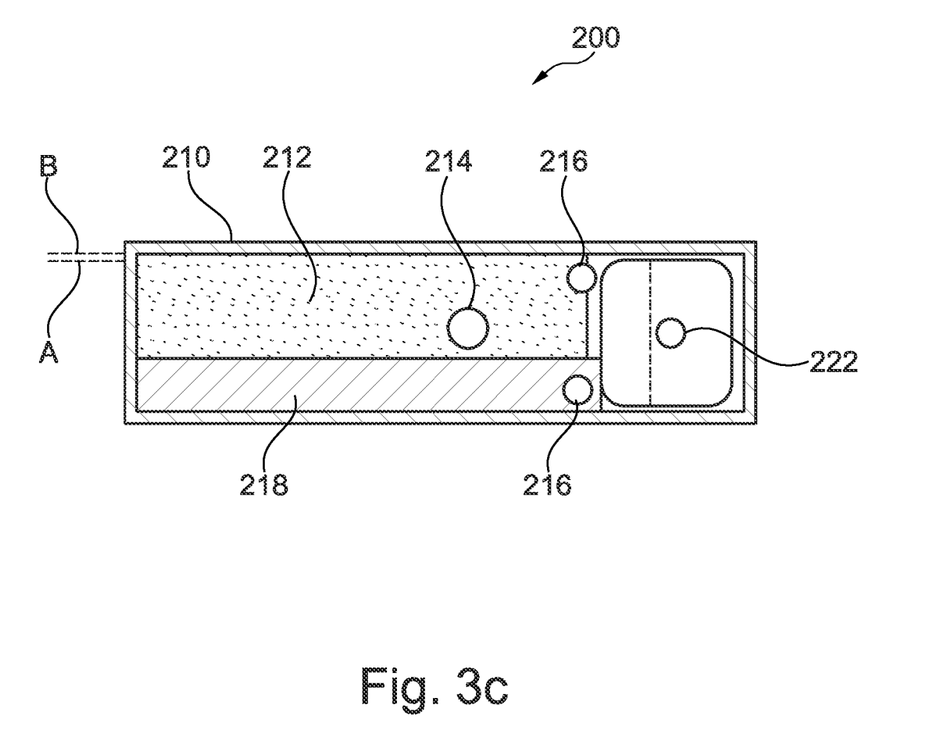
FIG. 3c represents the heat battery shown in FIGS. 3a and 3b in a horizontal or substantially horizontal orientation.

FIGS. 3a, 3b and 3c represent heat battery designs according to the present invention. The heat battery of the present invention comprises a pressurised inflatable member which may be an inflatable balloon e.g. a pressurised air balloon. The pressurised balloon is used to manage the expansion changes in volume of the PCM and/are the pressure in the heat battery cell during the thermal cycling of the heat battery. This is discussed in more detail below.

FIGS. 3a and 3b shows a heat battery 200 located in a vertical plane or a substantially vertical orientation.

The heat battery 200 comprises a battery cell case 210. Located within the battery cell case 210 there is a PCM 212. The PCM may be any suitable PCM which makes the present invention highly adaptable for a range of applications and heat storage requirements. There may be one type of PCM or a combination and plurality of PCM's present.

There is a filling port 214 located on the side of the battery cell case 210. The filling port 214 may be used to pour PCM 212 into the battery cell case 210.

There is also shown battery flow and return pipes 216 which are located on the side of the battery cell case 210, for example, above the filling port 214. The battery flow and return pipes 216 are located at, substantially at, or towards the upper surface of the PCM 212. The battery cell case 210 may also optionally comprise a cover plate in, for example, the upper front of the battery cell case 210 which allows an inflatable balloon 220 to be removed for servicing.

A heat exchanger 218 is also immersed in the PCM 212. Any suitable form of heat exchanger 218 may be used in the present invention. There may be one or a plurality of heat exchangers present.

As shown in FIGS. 3a and 3b, located above the PCM 212 there is an inflatable member. Any suitable type of inflatable member may be used. In particular embodiments, the inflatable member is in the form of an inflatable balloon 220. The balloon 220 may be any suitable shape and form and may, for example, be manufactured from any suitable plastics material which has a degree of expansion and/or elasticity. The material of the balloon 220 should also be resistant to the material forming the PCM 212.

The balloon 220 comprises a gas filling valve 222 (e.g. an air filling valve). The gas filling valve 222 may be used to increase and/or decrease the pressure and amount of gas (e.g. air) held within the balloon 220. The balloon 220 shown in FIGS. 3a and 3b is substantially cylindrical (e.g. tubular) in shape. However, any suitable shape may be used.

The pressures within the balloon 220 may range from about 0.1 bar gauge to about 6 bar gauge (i.e. about 1.1 bar absolute to about 7 bar absolute).

The cross-sectional diameter of the balloon 220 may be expanded and contracted to adapt for the expansion and/or contraction of material held within the battery cell case 210 such as the PCM 212. For example, the cross-section diameter of the balloon 220 may be expanded and contracted to cover at least about 50%, at least about 40%, at least about 30%, at least about 20%, at least about 10% or at least about 5% of the vertical height of the battery cell case 210.

A specific advantage of the balloon 220 is that also very minor changes such as less than about 5%, less than about 1% or less than about 0.5% may be made to the cross-section diameter by very slightly altering the pressure of the gas within the balloon 220. The balloon 220 of the present invention may therefore be used to finely tune the operation of the heat battery 200 allowing the heat battery 200 to operate at its optimal performance levels and to also avoid any form of degradation and/or dangers associated with over-pressurisation.

During the charging and/or discharging of the PCM 212, this will result in expansion and/or contraction of materials held within the battery cell case 210. As shown in FIGS. 3a and 3b, the PCM 212 expands and/or contracts within the boundary limits as in the vertical plane between levels represented by reference numerals 'A' and 'B'. The balloon 220 of the present invention may therefore be expanded and/or contracted depending on the expansion and/or contraction of the materials held within the battery cell case 210 such as the PCM 212.

The battery cell case 210 may comprise control sensors which may be used to monitor the expansion and flash or contraction of the PCM 212 by monitoring the level of the PCM 212. Any suitable form of sensors may be used for this monitoring. The control sensors may transmit this to a control system which may then activate a pressurisation and/or depressurisation of the balloon 220. Such a control system allows the balloon 220 to constantly keep the heat battery 210 operating at its optimal and maximum efficiency. Gas may therefore be fed into an/or allowed out of the gas filling valve 222 depending on the monitored level of the PCM 212.

To ensure that the integrity and functionality of the balloon 220 is maintained:
c) the material of the balloon will be compatible with the PCM e.g. metallised plastics
d) a battery charging pipe arrangement inside the battery will optionally be arranged such that there is no permanent presence of PCM surrounding the balloon when the PCM is in a solid state.

FIG. 3c represents the heat battery 200 located in a horizontal or substantially horizontal plane. The components are the same as set out in FIGS. 3a and 3b. The PCM 212 expands and contracts between horizontal levels 'A' and B'. Similar to above, to avoid any form of over-pressurisation the balloon 220 may be expanded and/or contracted. Once again, this allows the heat battery 200 to operate at its optimal and maximum efficiency. Additionally, any form of hazards associated with over-pressurisation are avoided.

The pressures within the balloon 220 may range from about 0.1 bar gauge to about 6 bar gauge (i.e. about 1.1 bar absolute to about 7 bar absolute).

The cross-sectional diameter of the balloon 220 may be expanded and/or contracted to adapt for the expansion and/or contraction of material held within the battery cell case 210 such as the PCM 212. For example, the cross-sectional diameter of the balloon 220 may be expanded and/or contracted to cover at least about 50%, at least about 40%, at least about 30%, at least about 20%, at least about 10% or at least about 5% of the vertical height of the battery cell case 210.

A specific advantage of the balloon 220 is that also very minor changes such as less than about 5%, less than about 1% or less than about 0.5% may be made to the cross-section diameter by very slightly altering the pressure of the gas within the balloon 220. The balloon 220 of the present invention may therefore be used to finely tune the operation of the heat battery 200 allowing the heat battery 200 to operate at its optimal performance levels and to also avoid any form of degradation and dangers associated with over-pressurisation.

Figure 4A:
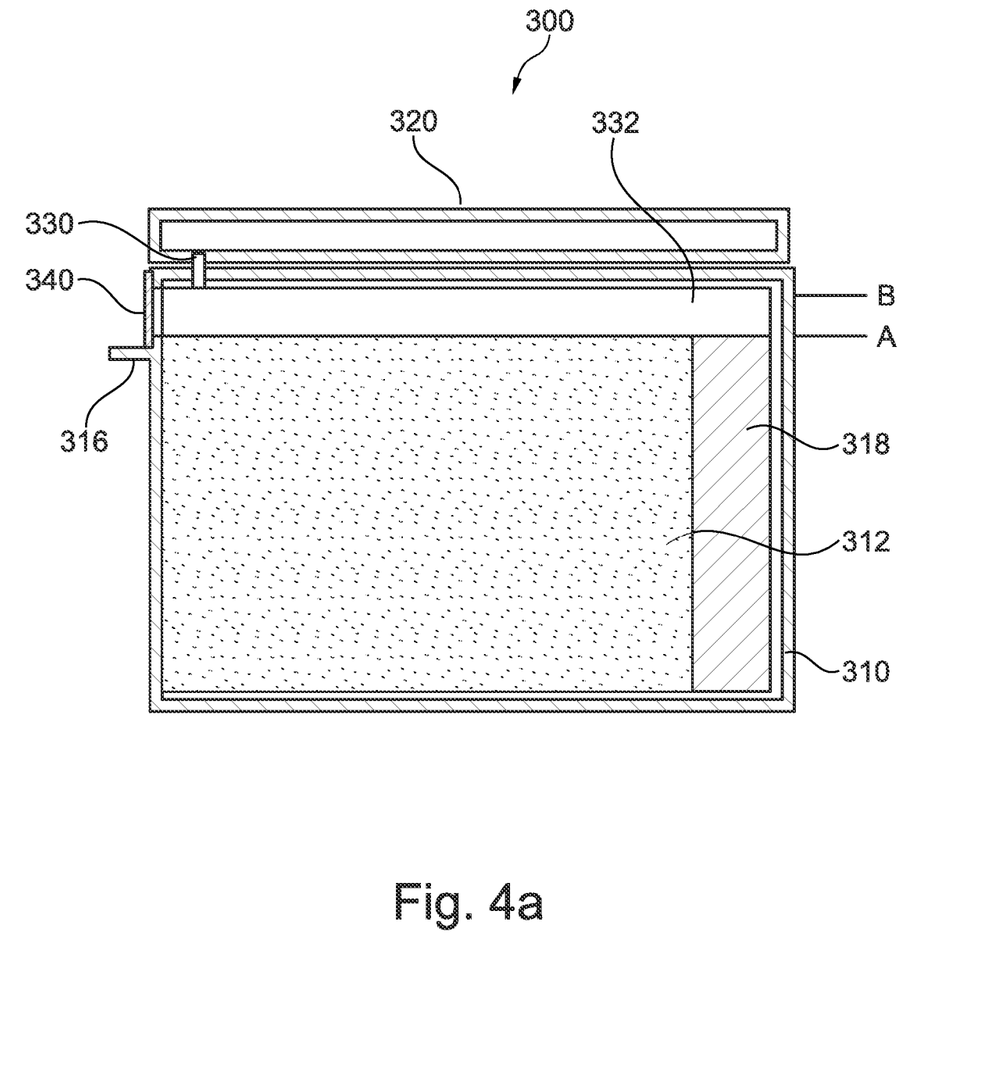
FIGS. 4a and 4b represent component parts of a heat battery according to a further embodiment of the present invention using a volume compensating chamber.
Figure 4B:
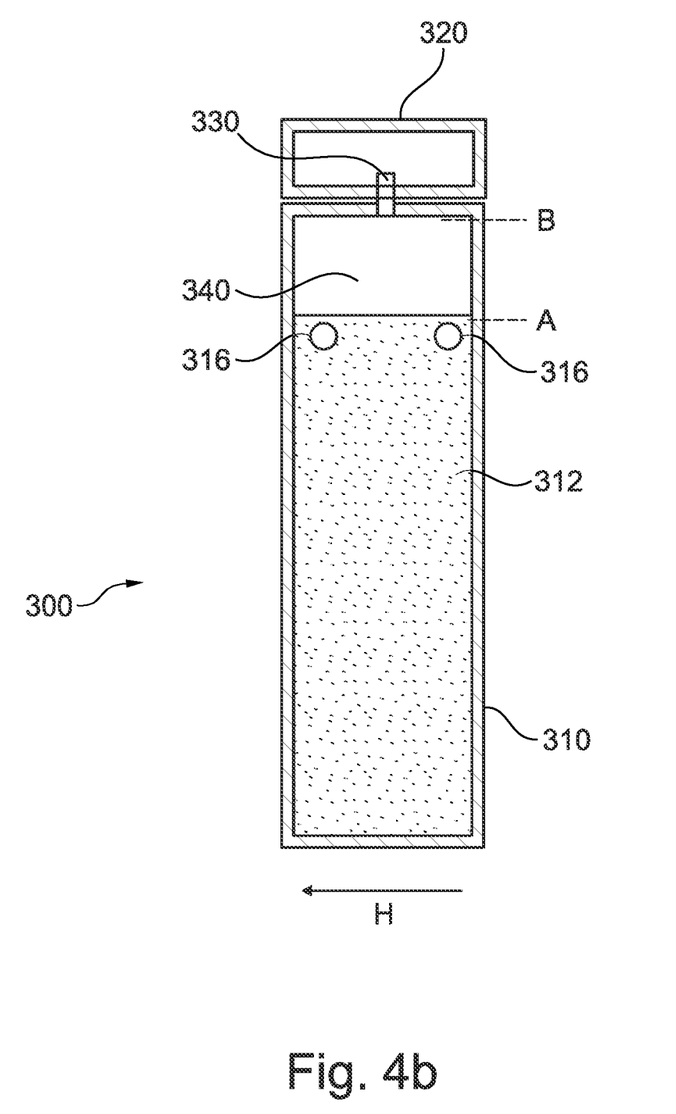
Figure 4C:
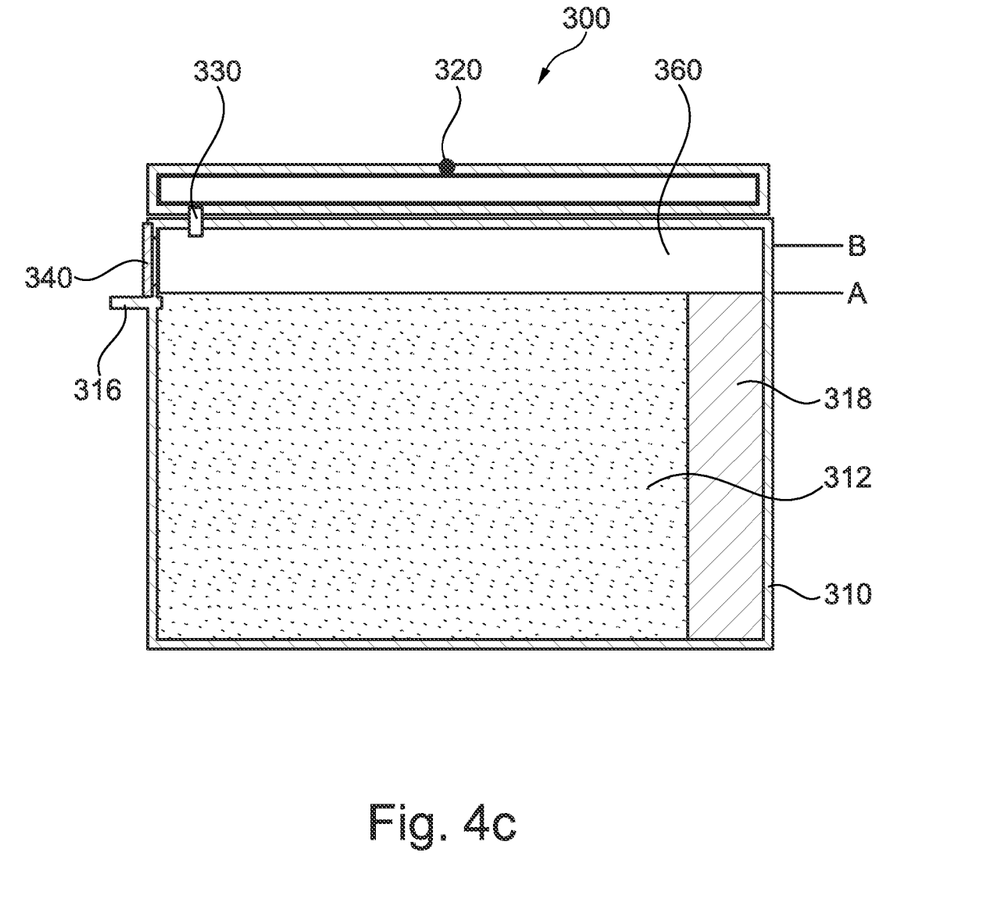
FIG. 4c represents a heat battery in use according to a further embodiment of the present invention in a vertical or substantially vertical orientation using a volume compensating chamber.

FIGS. 4a, 4b and 4c represent further embodiments of the present invention which relate to use of a separate volume compensator. This is discussed in more detail below.

FIGS. 4a and 4b show a heat battery 300 according to a further embodiment of the present invention. The heat battery 300 is in a vertical or substantially vertical orientation. FIG. 4a is a sectional side view of the heat battery 300 and FIG. 4b is an end sectional view of the heat battery 300.

The heat battery 300 comprises a battery cell case 310. Located inside the battery cell case 310 there is a PCM 312 and a heat exchanger 318. As shown in FIG. 4a the heat exchanger 318 is immersed in the PCM 312. There may be at least one or a plurality of heat exchangers.

On a side of the battery cell case 310 there are battery flow and return pipes 316. The battery flow and return pipes 316 are located at or just below the upper surface of the PCM 312.

On a side of the battery cell case 310 there is also an access cover 340 which allows access to the inside of the battery cell case 310 and the PCM 312. The access cover 340 also provides access to the sealed receptacle 332 allowing this to be removed and repositioned such as for the embodiment shown in FIG. 4c.

Located above the PCM 312 there is a sealed receptacle 332 which may be in the form of a sealed tube. The sealed receptacle 332 may be in any suitable shape and size. As shown in FIG. 4a, the sealed receptacle 332 extends along and across all or substantially all of the upper surface of the PCM 312. The sealed receptacle 332 therefore forms a covering across all or substantially all of the upper surface of the PCM 312.

FIGS. 4a and 4b also show that located on the upper surface of the sealed receptacle 332 there is an expansion port 330 which may optionally be self-sealing. The expansion port 320 is connected to a volume compensating chamber 320.

The volume compensating chamber 320 is a separate gas chamber (e.g. air chamber) which allows air to be fed into and/or out of the sealed receptacle 332 via the expansion port 330. The volume compensating chamber 320 therefore functions as a volume compensator.

The volume compensator chamber 320 is optionally separate from the heat battery 300. This allows the volume compensator chamber 320 to be positioned remotely from the heat battery 300. This provides a number of advantages such as allowing the volume compensator chamber 320 to control the pressure inside the heat battery 300 thereby overcoming over-pressurisation problems and the associated hazards.

In the arrangement shown in FIGS. 4a and 4b, the operating height of the heat battery 300 can be increased and/or decreased depending on the heat and/or discharge level of the PCM 312. For example, the operating height of the heat battery 300 can be increased to accommodate an expansion of the PCM 312 so that the operating height of the heat battery 300 is sufficient for the expanded volume of the PCM 312. In the event that the PCM 312 contracts and the upper level of the PCM 312 drops down then the operating height of the heat battery 300 can be decreased to accommodate the contraction of the PCM 312. This allows the pressure inside the battery cell case 310 to be constantly controlled and kept constant at a pre-determined optimal pressure. This may, for example, be atmospheric pressure. This enhanced control of the heat battery 300 avoids any form of hazards and dangers associated with over-pressurisation.

In FIGS. 4a, 4b and 4c the battery cell case 310 is filled by removing an access cover 340 and the volume compensating chamber 320 is connected to the heat battery 300 via an expansion port 330. The expansion port 330 is preferably self-sealing and gas-tight e.g. air-tight.

In FIGS. 4b and 4c there is shown a dimension 'H'. The dimension 'H' is preferably marginally greater than the equivalent standard width of a heat battery. There is also shown and air gap 360 located above the PCM 312. The size and/or volume of the air gap 360 may change, for example, between levels 'A' up to level 'B' due to expansion and/or contraction of the PCM 312.

In use, and when the heat battery 300 is in the vertical or substantially vertical orientation and as shown in FIG. 4c, the sealed receptacle 332 is therefore removed. During use of the heat battery 300 in the vertical or substantially vertical orientation, and as shown in FIG. 4c, the PCM 312 can expand from level 'A' up to level 'B'. During such an expansion, the gas (e.g. air in the air gap 360) above the PCM 312 will become compressed. The compressed gas exits via the self-sealing expansion port 330 into the volume compensator chamber 320. The pressure of the gas above the PCM 312 is therefore kept constant and/or substantially constant and/or at a pre-determined optimal pressure. This may, for example, be atmospheric pressure. However, any other suitable pressure may be chosen which is appropriate for the optimal operation of the heat battery 300.

Therefore, the PCM 312 can expand up to level 'B' and the gas (e.g. air in the air gap 360) in the heat battery 300 is compressed into the volume compensator chamber 320. When the PCM 312 contracts (i.e. cools and/or is discharged) then air can exit from the volume compensator chamber 320 back into the air gap 360 via the expansion port 330 e.g. which may be a self-sealing expansion port.

Therefore, although the actual size and/or volume of the air gap 360 may change, the actual pressure within the gap 360 may be kept constant by adapting and/or changing the amount of gas in the gap 360. Any suitable mechanism and/or device which allows the gas to transfer between the volume compensating chamber 320 and the gap 360 may be used.

In the event that the pressure drops in the gas (e.g. air) above the PCM 312, then gas may exit from the volume compensator chamber 320 back into the heat battery 300 via the self-sealing expansion port 330. It should be noted that the self-selling expansion port 330 is only one option of achieving the required balance of pressure and any other form of port and/or device to control the pressures may be used.

Figure 4D:
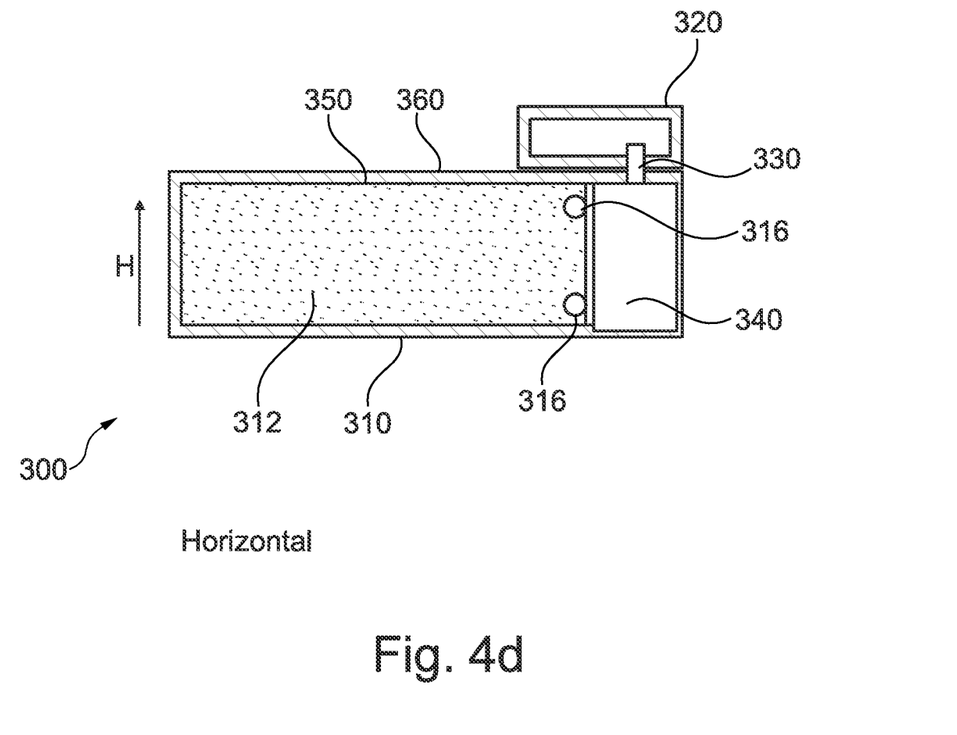
FIG. 4d represents a heat battery according to a further embodiment of the present invention in a horizontal or substantially horizontal orientation using a volume compensator.

FIG. 4d represents the heat battery 300 in a horizontal or substantially horizontal position. In the event that the heat battery 300 is to be used in the horizontal or substantially horizontal position, then the access cover 340 is removed and the volume compensator 320 are also removed as this requires to be repositioned. The sealed receptacle which is shown in FIG. 4a is then inserted in a manner similar to that shown in FIG. 4a. The volume compensator chamber 320 is then fitted onto the upper surface (i.e. the side) of the heat battery 300 when it is positioned in the horizontal or substantially horizontal position. The volume compensator chamber 320 is therefore in a different position to that shown in FIG. 4a.

In the horizontal or substantially horizontal position shown in FIG. 4d, the battery cell case 310 is filled with PCM 312 until there is a small gap 350 between the upper surface of the PCM 312 and the top located surface of the battery cell case 310. The gap 350 may be less than about 10 cm, less than about 5 cm, less than about 1 cm or less than about 0.5 cm.

Although not shown, the inner face of the top surface 360 of the battery cell case 310 is optionally contoured with, for example, grooves and/or channels which help to direct the expansion volume of the PCM 312.

During use and on expansion of the PCM 312, air evacuates from the gap 350 into the volume compensating chamber 320. In the event that the PCM 312 contracts then air is released from the volume compensating chamber 320 back into the gap 350 via the expansion port 330. The pressure in the gap 350 may therefore be constantly controlled and kept constant at a pre-determined optimal pressure. This may, for example, be atmospheric pressure. This enhanced control of the heat battery 300 avoids any form of hazards and dangers associated with over-pressurisation.

Utilising a separate volume compensating chamber 320 has a number of technical advantages. Examples of these technical advantages are listed below:

a) The plan area and dimensions of the integrated expansion space in prior art designs is the same as the heat battery as shown in FIGS. 1a, 1b and 2. This means that for a small plan area heat battery, the height of the expansion space required to accommodate expansion of PCM becomes large resulting in unnecessary increase in height of the overall heat battery.

With a separate expansion volume compensating chamber, the above restrictions can be overcome because the dimensions of the volume compensator can be made different and thereby reducing the overall height of the heat battery.

b) The separate expansion compensating chamber can be shaped to fit and utilise redundant space in the heat battery package and thereby making the overall heat battery package more compact.

c) With current design in the prior art designing a heat battery with two or more cells is not practical use of space occupied by integrated expansion chamber in each cell. However, with the separate volume compensating chamber approach, not only can the compensator be shaped to utilised redundant space in the battery but it can also be shared by more than one cells in the battery. In the present invention therefore any number of heat batteries may be controlled by at least one or a number of volume compensating chambers.

d) The separate volume compensating chamber can be located remote from the heat battery and therefore overall dimensions of the heat battery can be smaller and ideal for installing it in confined spaces.

e) The expansion volume compensating chamber is normally fitted with a pressure relief valve and its discharge may require handing in some applications. With the separate volume compensator, it will be possible to locate it in a position where it would be safe and easy to handle the discharge from the expansion valve if necessary Whilst specific embodiments of the present invention have been described above, it will be appreciated that departures from the described embodiments may still fall within the scope of the present invention. For example, any suitable type of expandable device may be used as the inflatable balloon. Moreover, any form of volume compensator may be used to control the pressure inside the heat battery.

The invention claimed is:

1. A heat battery located in a substantially vertical or substantially horizontal orientation comprising:
a battery cell case;
phase change material (PCM) located within the battery cell case;
at least one or a plurality of heat exchangers located within the battery cell case and immersed in the PCM;
an expandable device in the form of an inflatable gas balloon member which is capable of being inflated and/or deflated, the expandable device is located within the battery cell case and is capable of expanding and/or contracting to manage expansion and/or volumetric changes within the battery cell case;
a gas filling valve which extends through the battery cell case and is connected to the expandable device, wherein the gas filling valve is used to increase and/or decrease the pressure and/or amount of gas held within the expandable device;
control sensors which are used to monitor the expansion and/or contraction of the PCM by monitoring the level of the PCM;
a controller configured to pressurize and/or depressurize the inflatable gas balloon member based on the control sensors monitoring the level of the PCM such that the cross-sectional diameter of the inflatable gas balloon member is expanded and/or contracted and such that the inflatable gas balloon member is inflated and/or deflated to adapt for the expansion and/or contraction of the PCM and/or any gas/air trapped within the battery cell case and to prevent over-pressurization within the battery cell case; and
wherein the expandable device is located within and against an inner surface of the battery cell case and also extends across an upper surface of the PCM and along an upper surface of the at least one or the plurality of heat exchangers.

2. A heat battery according to claim 1, wherein the heat battery is located in a vertical orientation.

3. A heat battery according to claim 1, wherein the heat battery is located in a horizontal orientation.

4. A heat battery according to claim 1, wherein the battery cell case is in the form of an airtight enclosure.

5. A heat battery according to claim 1, wherein the battery cell case comprises an opening in the form of a filling port through which PCM is capable of being poured.

6. A heat battery according to claim 1, wherein the battery cell case comprises battery flow and return pipes.

7. A heat battery according to claim 6, wherein the battery flow and return pipes are located on the side of the battery cell case above a filling port.

8. A heat battery according to claim 6, wherein the battery flow and return pipes are located at or face towards an upper surface of the PCM.

9. A heat battery according to claim 1, wherein the battery cell case comprises a removable cover plate.

10. A heat battery according to claim 9, wherein the removable cover plate is located in the upper area of the heat battery cell which allows the expandable device to be removed.

11. A heat battery according to claim 1, wherein there is one expandable device, two expandable devices or a plurality of expanded devices located in the upper area of the battery cell case above the PCM.

12. A heat battery according to claim 1, wherein the cross-sectional diameter of the expandable device is expanded and/or contracted to cover at least about 5% of the vertical height of the battery cell case.

13. A heat battery according to claim 1, wherein the cross-sectional diameter of the expandable device is capable of being expanded and/or contracted by less than about 5% to alter the pressure of the gas within the expandable device.

14. A heat battery according to claim 1, wherein the control sensors transmit their measurements to a control system which are then capable of activating a pressurisation and/or depressurisation of the expandable device.

15. A heat battery according to claim 1, wherein the expandable device is formed from metallised plastic.

* * * * *

UNITED STATES PATENT AND TRADEMARK OFFICE
CERTIFICATE OF CORRECTION

| | |
|---|---|
| PATENT NO. | : 11,391,519 B2 |
| APPLICATION NO. | : 17/278774 |
| DATED | : July 19, 2022 |
| INVENTOR(S) | : Zaglio et al. |

It is certified that error appears in the above-identified patent and that said Letters Patent is hereby corrected as shown below:

On the Title Page

Item [30], correct "1815821" to read --1815821.2--

Signed and Sealed this
Eighth Day of November, 2022

Katherine Kelly Vidal
*Director of the United States Patent and Trademark Office*